US011780025B2

(12) United States Patent
Parker

(10) Patent No.: US 11,780,025 B2
(45) Date of Patent: Oct. 10, 2023

(54) TIG WELDING TORCH

(71) Applicant: JINAN UNIARC WELDING TECHNOLOGY LIMITED, Jinan (CN)

(72) Inventor: Tracy Parker, Worcestershire (GB)

(73) Assignee: JINAN UNIARC WELDING TECHNOLOGY LIMITED, Jinan (CN)

( * ) Notice: Subject to any disclaimer, the term of this patent is extended or adjusted under 35 U.S.C. 154(b) by 611 days.

(21) Appl. No.: 16/301,259

(22) PCT Filed: Jun. 15, 2017

(86) PCT No.: PCT/GB2017/051747
§ 371 (c)(1),
(2) Date: Nov. 13, 2018

(87) PCT Pub. No.: WO2017/216565
PCT Pub. Date: Dec. 21, 2017

(65) Prior Publication Data
US 2019/0210140 A1 Jul. 11, 2019

(30) Foreign Application Priority Data
Jun. 15, 2016 (CN) .......................... 201610416879.7
Jun. 15, 2016 (CN) .......................... 201610417070.6

(51) Int. Cl.
*B23K 9/29* (2006.01)
*B23K 9/167* (2006.01)
(Continued)

(52) U.S. Cl.
CPC .............. *B23K 9/296* (2013.01); *B23K 9/167* (2013.01); *B23K 9/285* (2013.01); *B23K 9/26* (2013.01)

(58) Field of Classification Search
CPC .......... B23K 9/167; B23K 9/26; B23K 9/285; B23K 9/296
See application file for complete search history.

(56) References Cited

U.S. PATENT DOCUMENTS 3,033,976 A 5/1962 McNutt
3,430,837 A 3/1969 Hein
(Continued)

FOREIGN PATENT DOCUMENTS

BE 580661 A 11/1959
CN 101522354 A 9/2009
(Continued)

OTHER PUBLICATIONS

"Gas tungsten arc welding torches (datasheet 256)", Welding Journal, American Welding Society, Miami, FL, US, vol. 92, No. 4, Apr. 1, 2013 (Apr. 1, 2013), p. 64, XP001582176.
(Continued)

*Primary Examiner* — Justin C Dodson
*Assistant Examiner* — Dilnessa B Belay
(74) *Attorney, Agent, or Firm* — Gearhart Law, LLC

(57) ABSTRACT

A TIG (Tungsten Inert Gas) welding torch (10) comprises a torch body (22), a collet (38a,b,c) for retaining a tungsten rod, and a back cap (42), in which the collet 838a,b,c) passes through an aperture in the torch body (22) from the front of the torch body (22) to the rear of the torch body (22), and is joined directly to the back cap (42) by a screw thread (40a,b,c), the collet (38a,b,c) being drawn backwards against a front section of the torch body (22), to close the collet (38a,b,c) and retain the tungsten rod when the screw thread (40a,b,c) is tightened.

6 Claims, 7 Drawing Sheets

(51) Int. Cl.
  *B23K 9/28* (2006.01)
  *B23K 9/26* (2006.01)

(56) References Cited

U.S. PATENT DOCUMENTS

| | | | |
|---|---|---|---|
| 4,142,086 A | 2/1979 | Rotilio | |
| 4,145,595 A * | 3/1979 | Keller | B23K 9/296 219/137.9 |
| 4,275,284 A | 6/1981 | Conley | |
| 4,775,774 A * | 10/1988 | Caneer, Jr. | H05H 1/3405 219/121.54 |
| 5,571,427 A * | 11/1996 | Dimock | B23K 9/296 219/136 |
| 2004/0050822 A1* | 3/2004 | Samler | B23K 9/296 219/75 |
| 2004/0050824 A1* | 3/2004 | Samler | B23K 9/296 219/138 |
| 2011/0198332 A1* | 8/2011 | Cenko | B23K 9/285 219/136 |
| 2013/0193117 A1* | 8/2013 | Wada | B23K 9/325 219/75 |
| 2013/0327746 A1* | 12/2013 | Hemmert | B23K 9/167 219/124.1 |
| 2017/0087659 A1* | 3/2017 | Wada | B23K 9/29 |

FOREIGN PATENT DOCUMENTS

| | | |
|---|---|---|
| CN | 201645008 U | 11/2010 |
| CN | 102528249 A | 7/2012 |
| CN | 102814581 A | 12/2012 |
| CN | 202951963 U | 5/2013 |
| CN | 103203524 A | 7/2013 |
| CN | 105290581 A | 2/2016 |
| CN | 205684878 U | 11/2016 |
| CN | 205684884 U | 11/2016 |
| DE | 19537988 C1 | 10/1996 |
| DE | 19828633 A1 | 12/1999 |
| EP | 2857136 A1 | 4/2015 |
| GB | 816632 A | 7/1959 |
| RU | 2242343 C1 | 12/2004 |
| RU | 2564657 C1 | 10/2015 |
| WO | 2013/184742 A1 | 12/2013 |

OTHER PUBLICATIONS

European Examination Report received for EP Patent Application 19185322.5, dated Jun. 22, 2022, 6 pages.
European Examination Report received for EP Patent Application 17732544.6, dated Jun. 22, 2022, 5 pages.

* cited by examiner

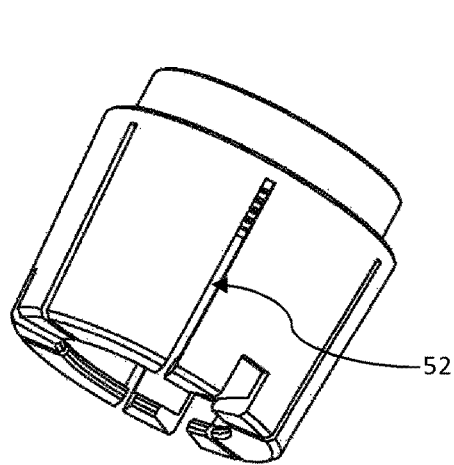 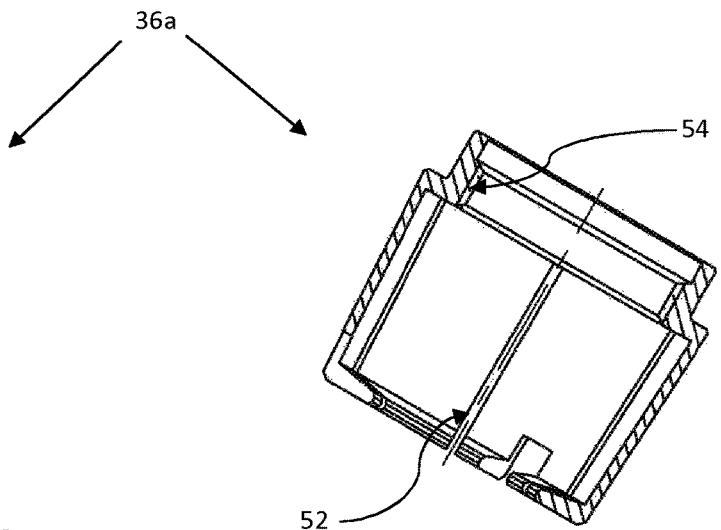
Figure 3a
Figure 3b
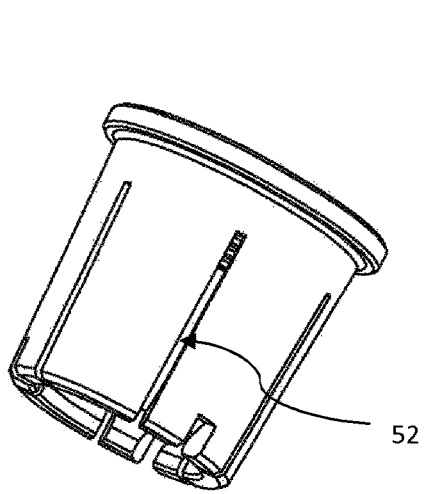 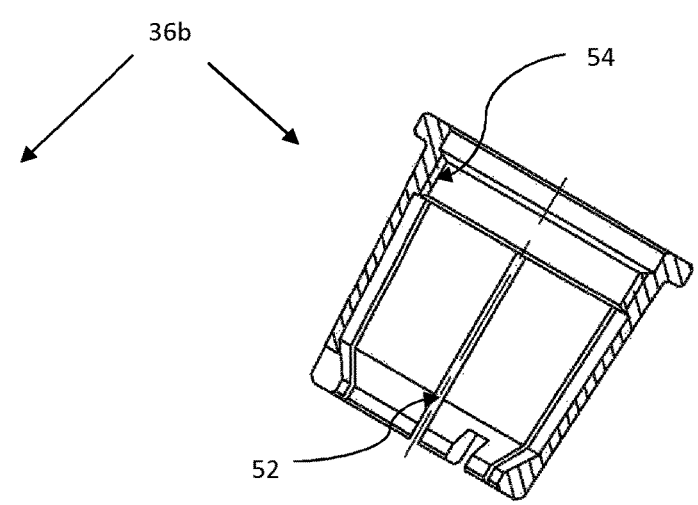
Figure 3c
Figure 3d

TIG WELDING TORCH

CROSS REFERENCE TO RELATED APPLICATION

This application is a PCT National Phase application based on PCT Application No. PCT/GB2017/051747 filed on Jun. 15, 2017, which claims priority of Chinese patent application No. 201610416879.7 filed on Jun. 15, 2016, and Chinese patent application No. 201610417070.6 filed on Jun. 15, 2016, all of which are incorporated herein by reference in their entirety.

The present invention relates to a TIG (Tungsten Inert Gas) welding torch.

BACKGROUND TO THE INVENTION

TIG welding uses an electrical arc between a non-consumable tungsten electrode and the metal workpiece to produce a weld. Normally, a filler metal is used and this is manually fed along the weld. A welder therefore holds the welding torch with the tungsten electrode in one hand and the filler metal in the other hand. The welding torch includes the means to deliver a shield gas around the weld site, to avoid oxidisation of the workpiece and poor-quality dross-filled welds. TIG welding is used to achieve high-precision welds.

In known welding torches, a ceramic nozzle is provided at the front of the torch, around the electrode. The purpose of the nozzle is to direct the shield gas to the weld site, where it is required to ensure a high-quality weld. Typically, the ceramic nozzle is provided with an internal screw thread, which corresponds with an external thread on the metal collet body, to hold the nozzle onto the front of the torch.

Often the limit on the longevity of the ceramic nozzle is that the screw thread becomes 'gritty' and eventually no longer corresponds properly with the screw thread on the collet body. It is difficult to achieve a good manufacturing tolerance and the ceramic nozzles do not last a long time.

TIG welding torches typically include a hollow back cap to protect the back of the tungsten rod. Although in principle the tungsten is not "consumable" in the same way as the welding rod in MIG welding, the tungsten rod will gradually be used up over time, and so typically rods are supplied in lengths of around 150-200 mm, and a rod will be fed slowly forward in the welding torch during its lifetime. The welder will choose the length of tungsten he wants to protrude from the front of the torch, depending on the particular operation being carried out. A collet in the welding torch holds the tungsten rod in its desired position during use. Typically, the collet is tightened by compressing it lengthways between a metal collet body with a closed front end from the front, and a back cap which screws on from the rear. Typically, both the metal collet body at the front and the back cap will attach with standard right-hand screw threads. As a result, the collet is subject to twisting during tightening. Over time, this damages the collet and limits its life.

The back cap must be sealed against the rest of the torch when attached, to prevent leakage of shield gas out of the back of the torch. This is typically achieved by providing an O-ring on the back cap, which seals against a seat on the torch body. Again, high precision manufacture is required to ensure sealing. Any damage can cause leakage of gas from the back of the torch and again this limits the longevity of the back cap and the torch body.

During use, the frontmost parts of the welding torch will get very hot. The tip of the tungsten itself, the front of the collet body, and the ceramic nozzle are directly exposed to the heat from welding. This heat is gradually conducted into the torch body and handle. As the handle heats up, it will become uncomfortable and unsafe to continue welding and the welder must stop to allow the equipment to cool. The shield gas has some cooling effect in addition to its shielding purpose, and some TIG welding torches are water cooled by a continuous flow of water through the body of the torch. However heat still limits the length of time a welder is able to continuously work.

It is an object of the invention to provide a TIG welding torch with better cooling performance and which uses parts that are longer lasting.

SUMMARY OF THE INVENTION

According to a first aspect of the invention, there is provided a TIG welding torch comprising a torch body, a collet for retaining a tungsten rod, and a back cap, in which the collet passes through an aperture in the torch body from the front of the torch body to the rear of the torch body, and is joined directly to the back cap by a screw thread, the collet being drawn backwards against a front section of the torch body, to close the collet and retain the tungsten rod when the screw thread is tightened.

Screwing the collet directly onto the back cap, and tensioning the collet longitudinally to close the collet, reduces the possibility of damage caused by torsion which is characteristic of known designs where the collet is tightened by compression from opposing screws at either end.

Preferably, a slot and key arrangement is provided between the collet and the torch body, to prevent rotation of the collet with respect to the torch body when the collet is inserted into the torch body. This ensures that the collet can easily be closed only by turning the back cap screw. The slot and key is preferably provided on a rear section of the collet, as close as possible to the screw which connects the collet to the back cap, or even on the screw itself. This provides a reaction to the twisting forces from the screw, at a point close to the screw longitudinally, to further avoid twisting along the length of the screw which would be caused by relying on reaction at the front of the collet. Also, the slot and key allows adjustment of the tungsten rod to take place at a high temperature without having to disassemble the front of the torch.

The front section of the torch body may have an interior taper, and the outside of the collet may have a corresponding exterior taper, so that the collet is closed to grip the tungsten rod as it is drawn backwards by tightening of the back cap.

It has been found that an optimal angle for the tapers is around 30 degrees, e.g., between 25 and 35 degrees, most preferably between 28 and 32 degrees, 29 and 31 degrees, or 30 degrees to the nearest degree. This optimal angle provides much easier release when disassembly is required.

Preferably, an undercut is provided in the collet forwards of the taper, so that the front of the taper on the collet can be fully inserted into the torch body, for example by around 1 mm. In front of the undercut a shoulder may be provided which prevents the collet from being further drawn backwards into the torch body when it is already fully closed. This avoids overtightening and ensures that there is always sufficient space for the required shield gas to flow through the collet.

Preferably, the collet includes a heat sink section where it passes through the torch body when fitted. The heat sink section includes cooling channels for allowing a cooling gas or liquid to conduct heat away from the collet, during use.

In both gas-cooled and liquid-cooled embodiments, the cooling channels substantially improve the cooling performance and result in a lower-temperature handle, allowing a welder to work for longer without having to wait for equipment to cool.

The collet is preferably made from brass. Typically in known designs the collet and collet body are made from copper. However, conduction of heat into the handle is reduced by using brass, further helping to keep the handle cool in use.

An integrated gas lens may be provided around the front of the collet, and may be retained in the undercut between the tapered section and the shoulder. Providing a gas lens to better direct the flow of shield gas is well known, but in known designs the gas lens has to be fitted in front of the collet and the length of the torch is necessarily increased. Providing a gas lens integrated around the front of the collet is possible in this arrangement where the collet is the front-most metallic part, and allows the overall length of the torch to be retained whilst realising the advantages of a gas lens. A slightly wider ceramic nozzle may however be required to accommodate the integrated gas lens.

According to a second aspect of the invention, there is provided a TIG welding torch including a torch body and a back cap, the back cap being attachable to the torch body by a screw thread, the torch body being overmoulded with a resilient material and the back cap including a tapered front section for interfacing with and sealing against the resilient overmoulding of the torch body.

The back cap may be directly attachable to the torch body by a screw thread, as is known in the prior art, or alternatively might be indirectly attached, for example by screw threading to a collet inserted through the torch body from the front, per the first aspect of the invention.

The seal between the back cap and the torch body is found to be more effective, reliable and long-lasting for preventing leakage of shield gas than the known technique of using an O-ring seal.

The overmoulding may be a heat-resistant silicone-based material. The main body of the back cap may be made from a heat-resistant phenolic based material.

According to a third aspect of the invention, there is provided a TIG welding torch including a torch body, a metallic front section for holding a tungsten rod and conducting electricity to the tungsten rod, and a ceramic nozzle for surrounding the metallic front section, characterised in that a heat isolation spacer is provided between the metallic front section and the ceramic nozzle, the heat isolation spacer being attached to the metallic front section at a rear end of the metallic front section and a rear end of the heat isolation spacer, and the heat isolation spacer extending forwards of the attachment, spaced from the metallic front section, and the ceramic nozzle being in contact with the heat isolation spacer forward of the attachment when the ceramic nozzle is fitted and the torch is ready for use.

The heat isolation spacer is provided between the metallic front section of the torch and the nozzle, the nozzle bearing against the outside of the heat isolation spacer when fitted.

Preferably, the metallic front section includes a cooling passage for allowing a cooling gas or fluid to flow, the cooling passage extending to a longitudinal point corresponding to the point of attachment between the heat isolation spacer and the metallic front section. Alternatively a thermal break may be provided in the form of a hollow wall in the metallic front section.

The heat isolation spacer is ideally made from a material with relatively low thermal conductivity. For example, stainless steel has been found to be suitable. Stainless steel has a lower thermal conductivity than brass and copper, which are the typical materials for the metallic front section. Preferably, the heat isolation spacer is tapered inwardly towards the front of the torch. The ceramic nozzle may also have a tapered interior profile.

The tapered heat isolation spacer ensures that the nozzle is held centrally and in a stable position relative to the metallic front section of the torch.

Preferably, the heat isolation spacer is attached to the metallic front section of the torch by means of a screw thread. The heat isolation spacer may be screwed up to meet a shoulder on the metallic front section. In some embodiments, the screw thread and the shoulder are the only points of contact between the heat isolation spacer and the metallic front section of the torch. The heat isolation spacer preferably extends forwards, beyond the screw thread. Preferably, at least two thirds of the length of the heat isolation spacer extends in front of the screw thread. However, the section of heat isolation spacer in front of the screw thread is ideally spaced from the metallic front section by, for example, around 0.5 mm, so there is no direct contact.

Longitudinal slots may be provided along the part of the heat isolation spacer which extends forward of the screw thread. The longitudinal slots allow the heat isolation spacer to be compressed slightly when the ceramic nozzle is positioned over the heat isolation spacer. When compressed the heat isolation spacer will bear outwardly on the ceramic nozzle from the inside of the ceramic nozzle. The ceramic nozzle is therefore retained by the heat isolation spacer, gripping the nozzle from the inside. The part of the heat isolation spacer which extends in front of the screw thread, when formed with slots, in effect is a series of leaf springs which push against the inside of the ceramic nozzle and grip against the internal surface of the ceramic nozzle.

A band made from an elastic material may be provided, one end of the band being stretched around a front end section of the torch body, and the other end of the band being stretched around a rear section of the ceramic nozzle, for providing a gas-tight seal between the nozzle and the torch body.

The band may be made from, for example, silicone. Ribs may be provided on internal surfaces of the band to provide a better grip and a better seal with the torch body and/or the ceramic nozzle. A rib may be provided on the front of the torch body, so that when fitted a rib on the inside of the band sits behind a rib on the outside of the torch body. A rib may similarly be provided on the outside of the ceramic nozzle if required. Preferably, the front exterior part of the torch body which includes the rib and interfaces directly with the band is made from silicone, or some other heat resisting material.

Using a spacer (and possibly a band) to retain the ceramic nozzle onto the torch body has advantages over the known method of using a screw thread, because it provides better thermal performance. Also, the ceramic nozzle may last longer since minor damage which might prevent proper operation of a screw thread will not prevent proper retention of the ceramic nozzle by the heat isolation spacer.

It will be appreciated that many embodiments will include features from multiple aspects of the invention.

DESCRIPTION OF THE DRAWINGS

For a better understanding of the invention, and to show more clearly how it may be carried into effect, preferred embodiments will now be described with reference to the accompanying drawings, in which:

FIG. 3 is a perspective view of two different options for the heat isolation spacer of the TIG welding torch of FIG. 1;

DESCRIPTION OF THE PREFERRED EMBODIMENTS

Figure 1:
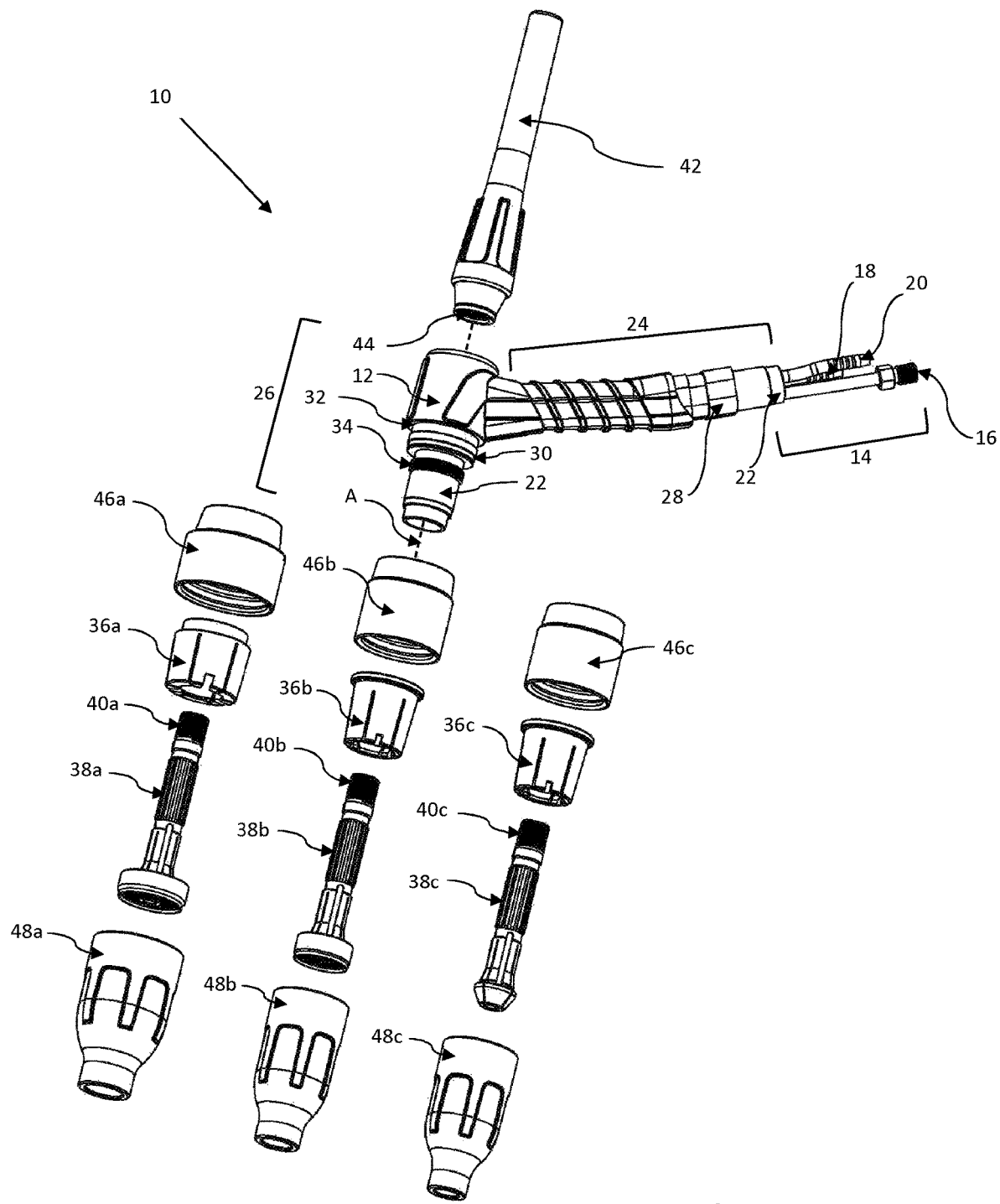
FIG. 1 is a perspective view of a liquid-cooled TIG welding torch according to the invention, including three different options for the collet, heat isolation spacer, nozzle and band.

Referring firstly to FIG. 1, a liquid-cooled TIG welding torch is indicated generally at 10. The torch is shown in a disassembled state, and three different options of the collet, nozzle, heat isolation spacer and band are shown.

The torch includes a torch body 12. The torch body includes an interface section 14 for attaching the torch to a welding machine. The interface section 14 includes a cooling liquid inlet 16 and a cooling liquid outlet 18, and a shield gas inlet 20. The liquid inlet and outlet 16,18 and the gas inlet 20 are all copper tubes. The copper tubes are brazed to a brass body 22. The copper tubes and the brass body together form a good electrical conductor, and so can also be used to electrically connect the welding torch to the welding machine, so that voltage can be supplied to the torch to strike an arc and make a weld.

The brass body extends along the neck section 24 and head 26 of the torch 10. The brass body 22 is overmoulded with an insulating material, for example silicone rubber. The neck section 24 includes a location formation 28 for a moulded handle in the form of an insulated casing (not shown in the drawings). The insulating casing may be rigid plastic and may be, for example, snapped or screwed together over the bottom part of the neck section of the overmoulded brass body 22. The insulating casing 28 extends from the neck section 24 to form a handle on the welding torch.

The brass body 22 in the head section 26 is hollow, i.e. an aperture passes all the way through the brass body 22 along the line indicated A.

The frontmost part 30 of the insulated section of the head 26 of the torch includes a rib 32. The backmost section of the uninsulated (exposed brass) part of the head 26 of the torch includes an external screw thread 34.

To assemble the torch, one of the heat isolation spacers 36a, 36b, 36c is screwed onto the screw thread 34 on the front of the brass body 22. One of the collets 38a, 38b, 38c is then passed through the centre of the heat isolation spacer 36a,b,c, and through the aperture in the head section 26 of the brass body 22. Each of the collets 38a,b,c includes an external screw thread 40a,b,c and this screw thread 40a,b,c corresponds with an internal screw thread 44 on the front of the back cap 42. Therefore, the collet 38a,b,c, torch body 12 and back cap 42 can all be held together by screwing the internal thread 44 of the back cap 42 onto the external thread 40a,b,c of the collet 38a,b,c.

When the collet is fitted, a band 46a,b,c can be stretched around the frontmost insulated section 30 of the torch body 12. A rib 32 on the torch body assists with retaining the band 46a,b,c onto the torch body 12, and preferably the band 46a,b,c also has one or more internal ribs. A nozzle 48a,b,c can then be fitted over the heat isolation spacer 36a,b,c. The nozzle 48a,b,c will be centred and held by the heat isolation spacer 36a,b,c. The front part of the band 46a,b,c is stretched over a rear section of the nozzle 48a,b,c. At least one rib (not visible in the drawing) is provided on the inside of the band 46a,b,c which assists with gripping of the band around the back part of the ceramic nozzle 48a,b,c. In some other embodiments, rib(s) may also be provided around the outside of the back of the nozzle.

Nozzles can be of a variety of shapes, sizes, diameters and lengths to suit specific welding requirements.

Figure 2:
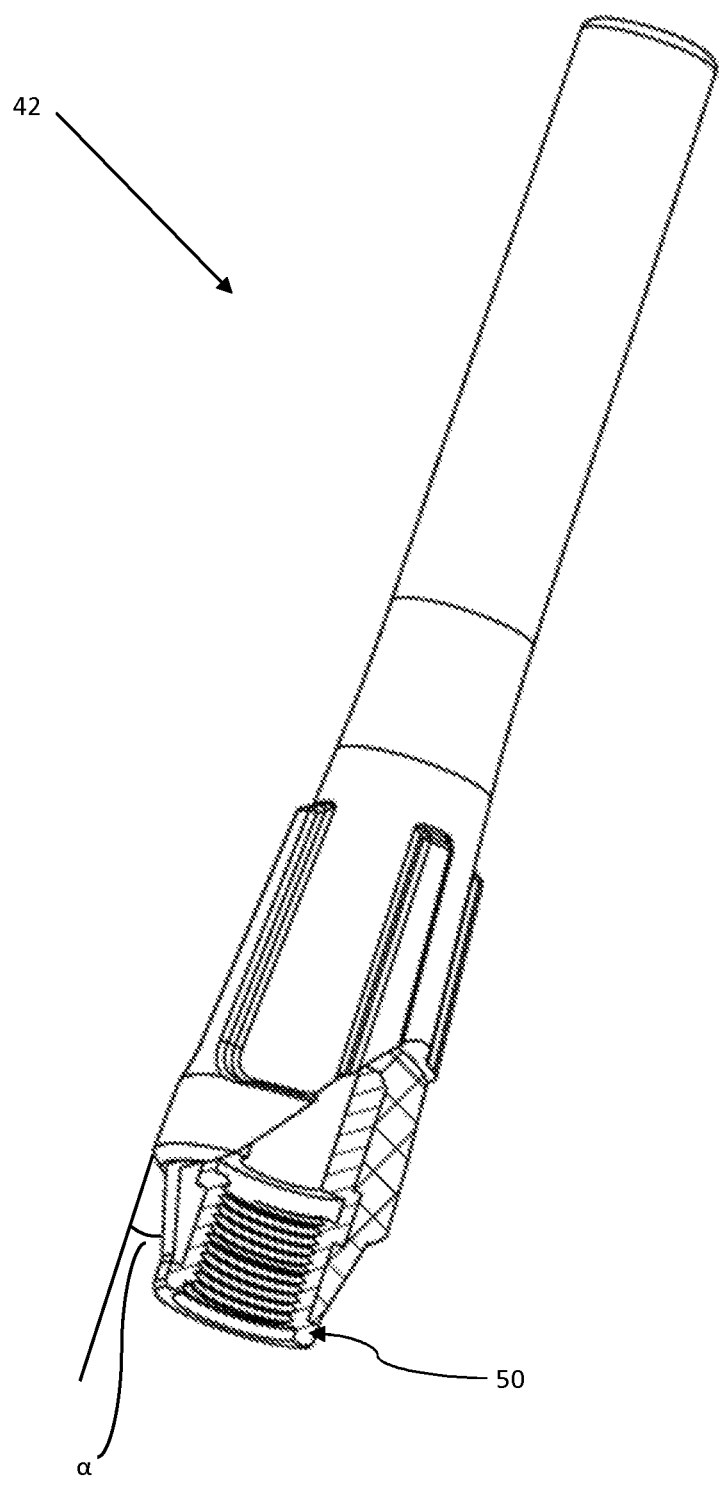
FIG. 2 is a perspective view of the back cap of the TIG welding torch of FIG. 1.

FIG. 2 shows the back cap 42 in more detail. The back cap is elongate and hollow, so that it can retain the back part of a tungsten rod. It is open at the end facing the torch body 12 in use (the bottom end in FIG. 2). The back cap is made from plastics, and has a brass threaded insert 50 at the open end. The exterior of the open end is tapered. The taper angle $\alpha$ is preferably 30 degrees.

The tapered front section of the back cap 42 forms a seal against the silicone overmoulding of the torch body 12, when the torch is assembled. The silicone overmoulding of the torch body 12 for this reason extends substantially behind the brass body 22 of the head 26 of the torch. Back caps can be supplied in a variety of lengths and are easily interchangeable on the torch to suit different requirements, for example restricted access to the weld site may require a shorter back cap.

FIG. 3 shows the heat isolation spacers 36a,b. Each of the heat isolation spacers is made from stainless steel, and each is substantially in the form of a tapered elongate shell which is wide towards the rear (towards the top of the FIG. 3 drawings) and narrower towards the front. Longitudinal slots 52 extend from the front of each heat isolation spacer, along for example two thirds of the length of the heat isolation spacer. The slots are equally spaced around the circumference of the heat isolation spacer, for example five slots may be provided spaced by 72 degrees. The stainless steel leaves defined by the slots form leaf springs, and so when the nozzle 48a,b,c is pushed onto the front of the heat isolation spacer 36a,b,c the leaves will deform inwardly, but push outwardly onto the inside surface of the nozzle 48,a,b,c, holding the nozzle in place on the heat isolation spacer. Each of the heat isolation spacers 36a,b includes an internal screw thread 54, near the rear end of the heat isolation spacer. The internal screw thread 54 corresponds with the screw thread (34, FIG. 1) on the brass body 22 of the head 26 of the torch, so that the heat isolation spacer may be screwed onto the brass body 22. The heat isolation spacer is designed to provide a thermal break between the nozzle and the body 22, thus preventing heat generated from the welding process from being transmitted to the body 22.

Figure 4:
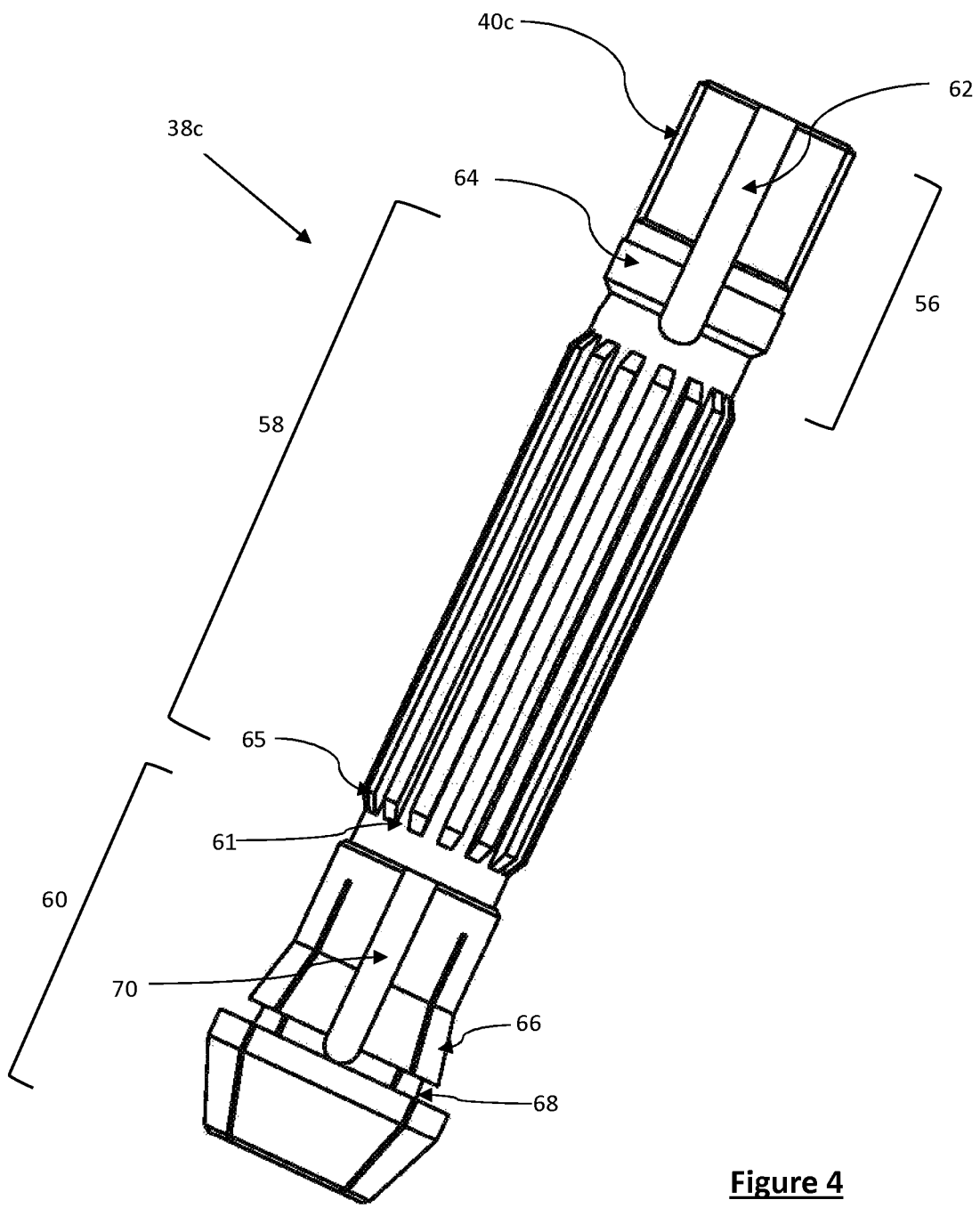
FIG. 4 is a perspective view of a collet which is part of the TIG welding torch of FIG. 1.

FIG. 4 shows the collet 38c in more detail. The collet comprises a rear attachment section 56, a central heat sink section 58 and a front grip section 60. The rear attachment section 56 includes the external screw thread 40c which corresponds with the internal screw thread on the threaded insert (50, FIG. 2) of the back cap (42, FIGS. 1,2). Also, a longitudinal slot 62 extends from the rear of the collet 38c, cutting through the screw thread and terminating in front of the screw thread 40c. A rib 64 is provided at the end of the screw thread, and the slot 62 passes also through the rib 64.

The rib 64 provides a shoulder to limit how far the collet 38c can be screwed into the back cap (42).

The slot corresponds to the position of a pin which extends from the inside wall of the hollow brass body of the torch head (26). As the collet 38c is passed through the aperture in the brass body, the pin slides into the slot 62. The pin and slot 62 prevent rotation of the collet 38c with respect to the brass body (22). This ensures that the collet 38c can be tightened onto the back cap (42) simply by holding the torch (for example by its handle) and rotating the back cap (42).

The heat sink section 58 of the collet 38c includes spines 65, and channels 61 running between the spines 65. In use, shield gas passes through the channels 61 on its way from the gas inlet (20) and out of the front of the nozzle (48c). This assists with cooling the torch.

The front grip section 60 of the collet 38c is the part which grips the tungsten rod when the collet 38c is closed. A tapered section 66 is provided, which is wider towards the front of the collet 38c and narrower towards the rear. In use, the tapered section 66 passes into the front of the aperture in the brass body (22) of the head (26) of the torch. As the collet 38c is drawn backwards by tightening the screw thread 40c onto the back cap 42, wider and wider parts of the tapered section 66 are drawn into the aperture in the brass body (22) of the head (26). This closes the jaws of the collet 38c to retain the tungsten rod. Preferably, the front opening of the aperture in the brass body (22) is internally tapered to match the taper 66 of the collet 38c. The jaws will therefore move from fully open to fully closed on very slight movement of the collet 38c from an open position where the front edge of the tapered section 66 is just in line with the opening of the body (22) of the head (26), to a closed position where the front edge of the tapered section 66 is recessed within the opening of the body (22) of the head (26) by for example 0.5 mm. In front of the front edge of the tapered section 66, an undercut 68 is provided. The undercut 68, together with longitudinal slots 70 through the tapered section 66, provide gas flow channels to allow shield gas to flow from the channels 61 of the heat sink section 58, through the front of the collet 38c and out of the nozzle.

Figures 5A, 5B:
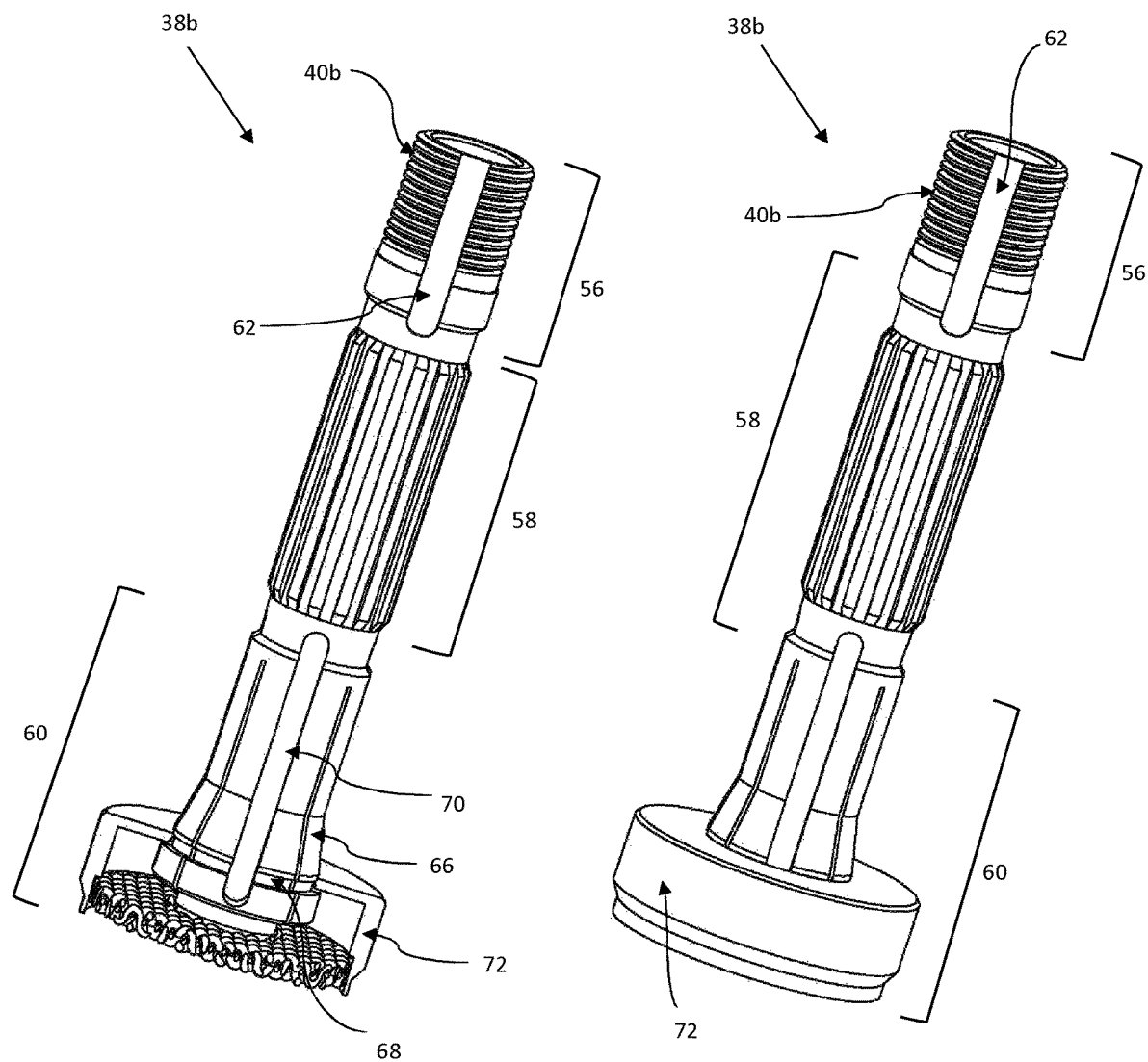
FIG. 5 is a perspective view of a collet with an integrated gas lens which is an alternative option for the collet of the TIG welding torch of FIG. 1.

FIGS. 5a and 5b show an alternative collet 38b. The collet 38b again has an attachment section 56 and a heat sink section 58. These parts are substantially identical to those of the collet 38c in FIG. 4. The grip section 60 likewise includes a tapered section 66, an undercut 68 and longitudinal slots 70. However, this alternative collet 38b is provided with an integrated gas lens 72. The gas lens 72 is of a known type—a series of meshes provided in the path of the shield gas serves to direct the shield gas, ensuring more uniform flow and better welding performance. The gas lens 72 is integrated into the collet. This is done by providing circumferential slots around the jaws of the collet. Internal rings on the gas lens assembly 72 are retained in the circumferential slots. This allows the gas lens to be fitted around the jaws of the collet, which means there is no increase in the length of the torch when fitted with a gas lens. This allows the advantages of the gas lens to be realised without making the torch long and cumbersome.

Figure 6:
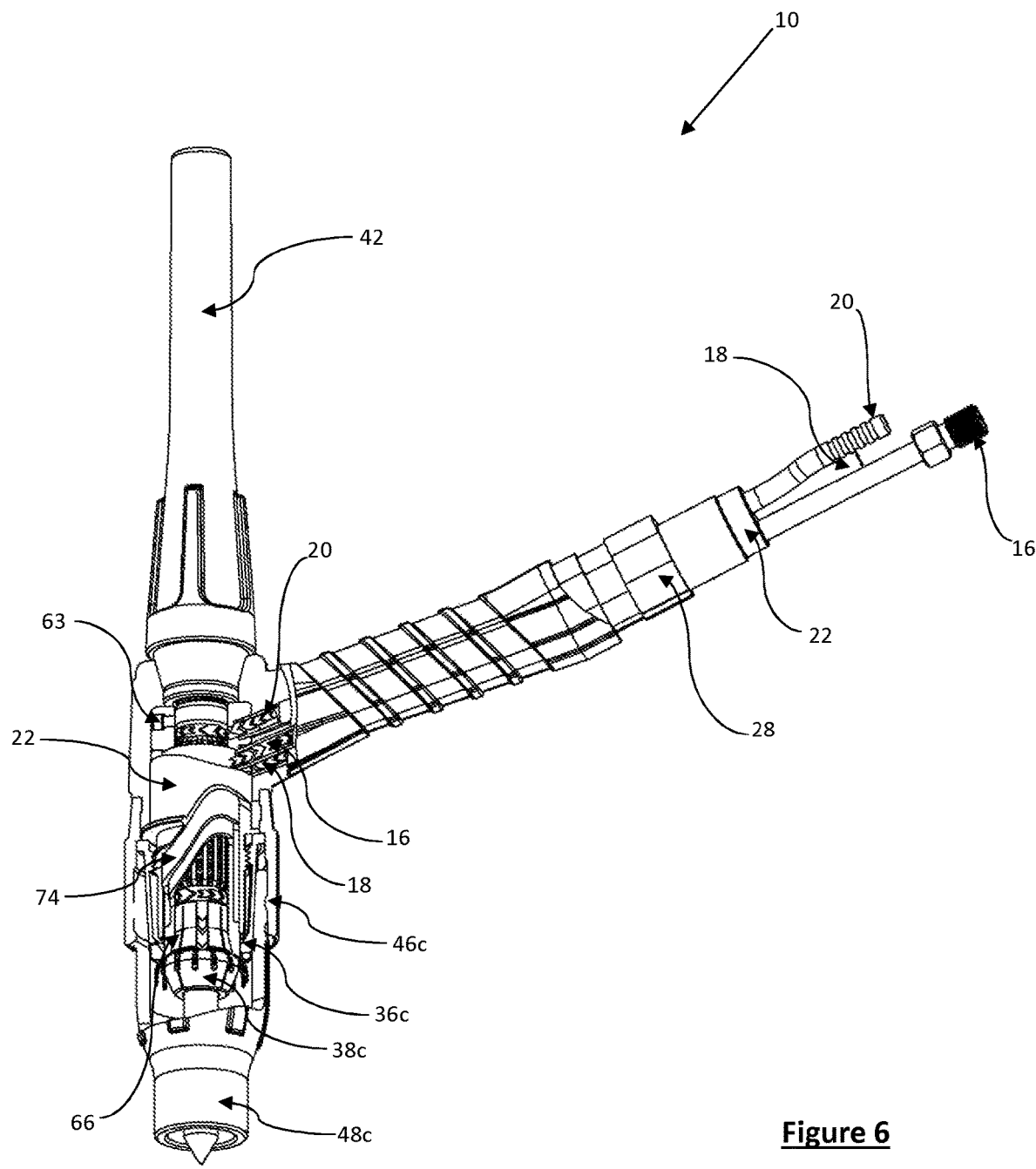
FIG. 6 is a cutaway view of the TIG welding torch of FIG. 1, showing liquid and gas flow channels.

FIG. 6 shows the welding torch of FIG. 1, when fully assembled. Parts of the torch are cut away so that gas and liquid flows can be seen.

The band 46c is seen fitted in FIG. 6, providing a gas-tight seal between the nozzle and the torch body. The band 46c is shown in cross-section, and internal ribs on the band are visible, both where the band 46c contacts the torch body and where the band contacts the nozzle 48c.

At the back of the torch body, a pin 63 is visible. The pin 63 corresponds with the slot (62) in the collet 38c, to prevent the collet 38c from rotating with respect to the torch body when it is fully inserted into the aperture in the torch body. Also clear from FIG. 6 is the extent of the silicone overmoulding behind the brass body 22 of the torch head 26. The silicone overmoulding extends behind the brass body 22 by almost the extent of the tapered section of the back cap 42. With the back cap 42 fully tightened onto the collet 38c, the tapered section of the back cap 42 forms a gas-tight seal with the silicone overmoulding of the torch head 26, preventing any leaking of shield gas out of the back of the torch.

The front section of the brass body 22 of the torch is also shown in cross-section, and the tapered entrance which corresponds to the tapered section 66 of the collet 38c is visible.

The flow of inert shield gas through the welding torch 10 is indicated by arrows. From the end of the inlet tube 20 at the top of the neck (to the left of FIG. 6), shield gas flows in the channels (61) of the collet 38c, between the collet 38c and the inside wall of the brass body of the torch head 26. The gas then flows through the slots (70) in the jaws of the collet 38c, and then out of the small gap between the collet 38c and the front edge of the brass body 22, at the very front of the undercut (68) in the collet 38c. The gas is then directed towards the workpiece by the nozzle 48c.

The brass body 22 of the head 26 of the torch 10 has a hollow wall. This forms a liquid-filled jacket which allows cooling liquid to pass from liquid inlet 16, into the hollow wall of the brass body, and then out of the liquid outlet 18. The liquid jacket is indicated at 74.

The heat isolation spacer 36c is shown installed on the torch with the thread 54 screwed onto the brass torch body 22. It is apparent from the cross section in FIG. 6 that the heat isolation spacer 36 is only in contact with the brass body at the thread 54, and just to the rear of the thread. The parts of the heat isolation spacer 36c which are forward of the thread 54 are spaced from the brass body 22. This reduces heat transfer from the nozzle into the brass body. It will also be noted that the small part of the brass body which is in contact with the heat isolation spacer is substantially centrally disposed relative to the hollow wall section, which is cooled by liquid. These features increase the time for which welding can be carried out before the handle of the torch becomes hot.

Figure 7:
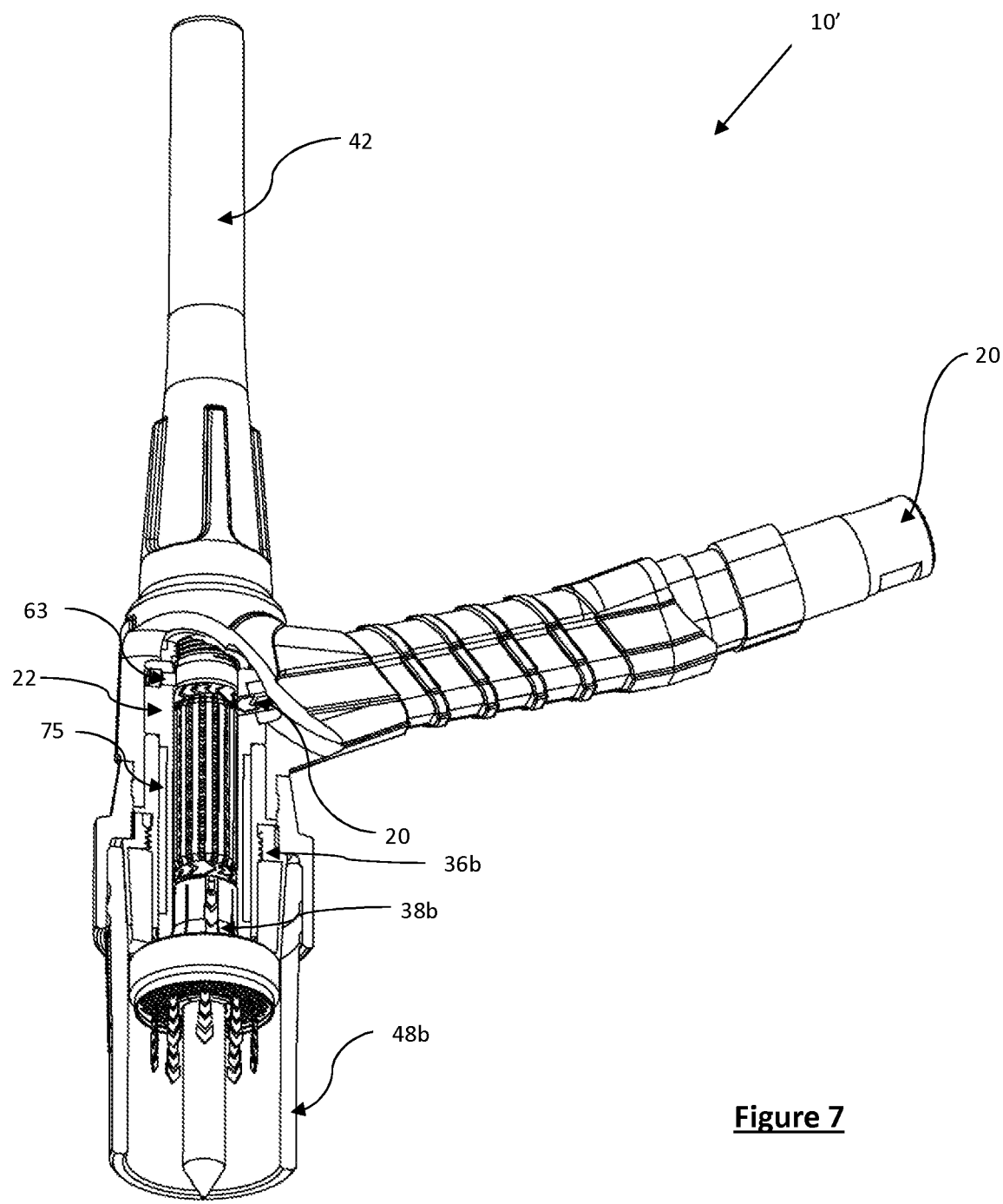
FIG. 7 is a cutaway view of a gas-cooled TIG welding torch according to the invention, fitted with the integrated gas lens collet of FIG. 5.

FIG. 7 shows the gas-cooled version of the torch of FIG. 6. Again, arrows show the flow of gas through the torch. The gas flow is identical to that in the torch of FIG. 6, passing through the channels in the collet 38b, and then out of the front, directed by the nozzle. The gas-lens version of the collet 38b is fitted in FIG. 7, but equally the collet 38c without the gas lens could be fitted to the gas-cooled torch 10'.

The construction of the brass body 22 of the torch 10' is again almost identical to that of torch 10. The brass body 22 still has a hollow wall, although no liquid flows within the cavity. Instead, the hollow cavity 75 in the brass body 22 forms a thermal break, insulating the outside of the brass body from the inside. This reduces heat transfer from the nozzle 48b, which is closest to the hot workpiece, into the brass body 22 and then to the handle of the torch 10'. Again, the heat isolation spacer 36b is only in contact with the brass body 22 over a very small area, and the area of contact is substantially central on the extent of the hollow thermal break 75.

The torches 10, 10' retain the nozzle 48a,b,c using the heat isolation spacer to grip the nozzle from the inside. The nozzles 48*a,b,c* therefore do not require manufacture with a screw thread, which increases possible manufacturing tolerances, reduces cost, and improves durability. The collet 38*a,b,c* will also last longer than in similar known torches, because it is not subject to twisting forces when tightened. The twisting from rotation of the back cap 42 is resisted very close to the back cap 42 longitudinally, by the pin 63 in the slot 62.

The gas seal at the back of the torch 10, 10' is also more reliable and longer lasting than in known designs. The tapered front section of the back cap 42, which seals against the silicone overmoulding behind the back of the brass body 22, provides a high-quality seal.

Finally, the torch 10, 10' has excellent thermal performance compared with known designs. The nozzle is joined to the body of the torch via a heat isolation spacer 36*a,b,c*. The heat isolation spacer is made from stainless steel which has lower thermal conductivity than brass or copper, and the area of contact between the heat isolation spacer and the brass body is very small. Furthermore, where the heat isolation spacer does contact the brass body, there is either a thermal break or liquid cooling channel, limiting the heat that is transferred into the handle of the torch.

The embodiments described above are provided by way of example only, and various changes and modifications will be apparent to persons skilled in the art without departing from the scope of the present invention as defined by the appended claims.

What is claimed is:

1. A TIG (Tungsten Inert Gas) welding torch comprising a torch body, a back cap, and a collet for retaining a tungsten rod, the collet including an exterior tapered section which is wider towards a front of the collet and narrower towards a rear of the collet and a back cap, in which the collet passes through an aperture in the torch body from the front of the torch body to the rear of the torch body, the aperture having a front section with an internal tape, and in which the collet is joined directly to the back cap by a screw thread, the collet being drawn backwards against a front section of the torch body, to close the collet and retain the tungsten rod when the screw thread is tightened, and in which a slot and key arrangement is provided between the collet and torch body, for preventing rotation of the collet with respect to the torch body when the collet is inserted into the torch body.

2. A TIG welding torch as claimed in claim 1, in which the slot and key is provided on a rear section of the collet.

3. A TIG welding torch as claimed in claim 1, in which an undercut is provided in the collet, forwards of the taper section.

4. A TIG welding torch as claimed in claim 1, in which the collet includes a central heat sink section, the heat sink section including channels allowing gas flow to cool the collet in use.

5. A TIG welding torch as claimed in claim 1, in which an integrated gas lens is provided around the front of the collet.

6. A TIG welding torch as claimed in claim 5, in which the gas lens is retained in an undercut forwards of the tapered section of the collet.

* * * * *